United States Patent
Pugh (10) Patent No.: US 6,531,670 B1
(45) Date of Patent: Mar. 11, 2003

(54) MOTOR CONTROL CENTER RELAY RESET MECHANISM

(75) Inventor: Richard Daryl Pugh, Seneca, SC (US)

(73) Assignee: Square D Company, Palatine, IL (US)

( * ) Notice: Subject to any disclaimer, the term of this patent is extended or adjusted under 35 U.S.C. 154(b) by 0 days.

(21) Appl. No.: 09/697,778

(22) Filed: Oct. 26, 2000

(51) Int. Cl.⁷ .............................................. H01H 3/20
(52) U.S. Cl. ..................... 200/329; 200/330; 200/337; 200/341
(58) Field of Search ................ 200/329–345, 200/50.01–50.4

(56) References Cited

U.S. PATENT DOCUMENTS

| | | | |
|---|---|---|---|
| 3,363,147 A | * 1/1968 | Cataldo et al. | 200/50.39 |
| 4,005,615 A | 2/1977 | De Visser | 74/504 |
| 4,011,423 A | 3/1977 | Zepp | 200/330 |
| 4,051,340 A | 9/1977 | Wolski | 200/329 |
| 5,959,518 A | 9/1999 | Passow | 335/78 |
| 6,087,602 A | 7/2000 | Bernier et al. | 200/50.11 |

* cited by examiner

*Primary Examiner*—Ramon M. Barrera
(74) *Attorney, Agent, or Firm*—David R. Stacey; Larry T. Shrout; Larry I. Golden (57) ABSTRACT

The present invention comprises a reset mechanism for an overload relay. More particularly, the present invention comprises a mechanism that will reset a plurality of overload relay within a starter in a motor control unit. A single point-to-two point overload reset mechanism allows for the use of a single manual door reset button and extension arm to depress the single point-to-two point overload reset mechanism, which in turn depresses a plurality of overload relay reset buttons. Following contact with the overload relay reset buttons, the single point-to-two point overload reset mechanism returns to a non-contact position with respect to the overload relay reset buttons.

15 Claims, 8 Drawing Sheets

MOTOR CONTROL CENTER RELAY RESET MECHANISM

BACKGROUND OF THE INVENTION

This invention relates generally to overload relays utilized in motor control centers and more particularly to a reset mechanism for overload relays in a motor starter assembly within a motor control center.

A motor control center provides for grouping of electrical motor control and other related devices in a compact, free-standing installation. Common components within a motor control center include a motor starter, which requires some form of overcurrent protection. Fuses and/or overload relays are commonly provided with the starters for overcurrent protection. Overload relays are electrical switches typically employed in industrial settings to protect electrical equipment from damage due to overheating in turn caused by excessive current flow.

In a conventional setup, an overload relay is connected in series with a control switch. When an overload condition is detected by the relay, the same cuts off power to the coil of the relay allowing the relay to open and disconnect the electrical equipment that is controlled by the relay from the source of power to prevent damage to the electrical equipment.

In a typical case, an overload relay, once tripped, will remain in an open position thereby preventing current flow. Consequently, in order to resume operation of the equipment being controlled by the system, the overload relay must be reset and this is typically accomplished manually. Usually, a push button is employed so that the person operating the equipment may push the push button to cause a reset of the system, causing the overload relay to again allow current to flow to the electrical equipment.

Traditionally, the prior art has provided reset extension arms that are mounted to the enclosure door with a connection between the door mounted reset button and the reset buttons on the overload relays. Thereby the overload relay may be reset merely by depressing the button without the necessity of opening the enclosure door.

U.S. Pat. No. 4,051,340 discloses an overload relay reset assembly comprising a reset rod and an extension rod. The extension rod is detachably mounted to the reset rod, wherein the extension rod extends from the reset rod to an access door of a metal enclosure containing the overload relay.

U.S. Pat. No. 4,011,423 discloses a common reset extension for a plurality of overload relays. A reset extension is provided for resetting all relays simultaneously by depressing a single reset button mounted on the cover of an enclosure, which houses the relays. The reset extension contains pockets for receipt of the relay reset handles, which are biased in a forward direction by a spring and can be manually depressed in a rearward direction.

U.S. Pat. No. 4,005,615 discloses a reset mechanism for an overload relay which is manually operable from the exterior of a explosion proof threaded enclosure. The reset mechanism includes a handle rotatably mounted on the exterior of the enclosure, a connecting rod having one end mechanically coupled to the handle and positioned within the enclosure for reciprocal movement between an initial position and a reset position, and an actuating member mechanically coupled to the other end of the rod and having the ability to engage and depress the reset button when the rod is moved by the handle to a reset position.

Use of prior art mechanisms, such as a T-bar attached to a door mounted manual reset button's extension arm, allow for possible access to a plurality of overload relay reset buttons when no obstruction exists in the motor control center for door opening-closing and travel of the door's manual reset button's extension arm. However, the prior art fails to appreciate the problem of using a single manual reset button and extension arm to reset a plurality of overload relays when at least one of a plurality of overload relays is obstructed.

An electromechanical solenoid-type reset device may also be used to reset an overload relay. These solenoids are electrically wired out to a push-button contact on the motor control center door. In applications where there are a plurality of overload relays, each relay will require a separate solenoid for the purpose of resetting the relay. The requirement of multiple solenoids increases the cost of the motor control center and, therefore, is not an economical solution.

In order to overcome the above noted disadvantage of the prior art, the present invention provides for a single point-to-two point overload relay reset mechanism. The single point-to-two point overload relay reset mechanism provides a low-cost solution for accessing a plurality of overload relay reset buttons in a motor control center with the use of a single door mounted manual reset button and extension arm.

SUMMARY OF THE INVENTION

It is the principal object of the present invention to provide a new and improved reset mechanism for an overload relay. More particularly, it is an object of the present invention to provide such a mechanism that will reset a plurality of overload relays within a motor starter located in a motor control center. A single point-to-two point overload reset mechanism allows for the use of a single manual door reset button and extension arm to depress the single point-to-two point overload reset mechanism, which in turn depresses a plurality of overload relay reset buttons. Following contact with the overload relay reset buttons, the single point-to-two point overload reset mechanism returns to a non-contact position with respect to the overload relay reset buttons.

Examples of the more important features of the invention thus have been summarized rather broadly in order that the detailed description thereof that follows may better be understood, and in order that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals and wherein.

DESCRIPTION OF THE PREFERRED EMBODIMENT

A motor control center provides for grouping of electrical motor control and other related devices in a compact, economical, free-standing installation. A motor control center is made of standardized vertical sections consisting of totally enclosed, dead front, free-standing structures bolted together. These sections support and house control units, a common bus for power distribution to the control units and a network of wire trough and conductor entrance areas to accommodate outgoing load and control wires. An example of suitable dimensions of a motor control center includes a 15 in. (381 mm) or 20 in. (508 mm) deep section provided for front-of-board mounting. The standard motor control center width is 20 in. (508 mm) with a 4 in. (102 mm) wide vertical wireway.

Control units contained within the motor control center commonly include combination starters, branch feeder devices and lighting panelboards. Each component is mounted in an individual isolated compartment within the motor control center. The motor starter assembly 20 in FIGS. 1–4 provides for electrical control in the acceleration and deceleration of a motor (not shown) in either direction of rotation. The motor starter assembly comprises, in part, a stab mounting assembly 21 for unit connection to the power bus, a control fuse block assembly 22 for overcurrent protection, a control station panel assembly 23 for mounting unit controls and lights, a control terminal block assembly 24 for unit connection to outside control circuits and a unit saddle assembly 25 for enclosing and supporting unit components. A motor starter assembly for a two-speed two winding motor, for example, consists of a single disconnect with a starter for each speed. The two starters must be electrically and mechanically interlocked to prevent both windings from being energized at the same time. Two-speed, two-winding starter assemblies may be used to control any of the three motor applications of constant horsepower, constant torque or variable torque.

A combination starter assembly is so named because it combines a disconnect means, which incorporates a short circuit protective device, and a magnetic starter in one enclosure. Compared with a separately mounted disconnect and starter, the combination starter assembly takes up less space, requires less time to install and wire and provides greater safety. Combination starter assemblies are furnished with circuit breakers or fuses to provide for overcurrent protection and are available in non-reversing and reversing versions. The motor starter 20 in FIGS. 1–4 contains a single overload relay 26 having a reset button 27 which can easily be accessed with the use of a door mounted reset button and extension arm.

Figure 1:
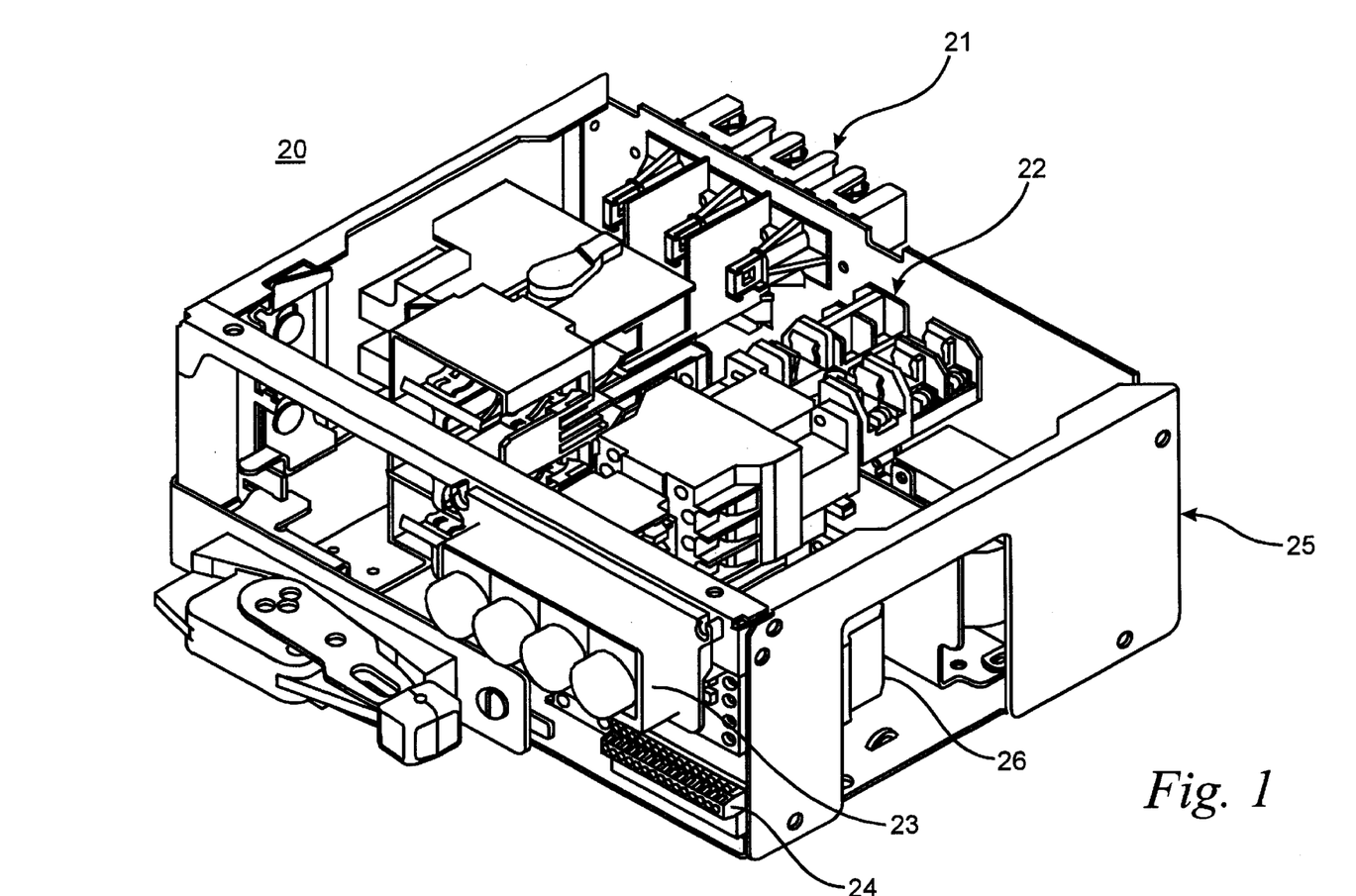
FIG. 1 is a front perspective view of a motor starter assembly containing at least one overload relay.
Figure 2:
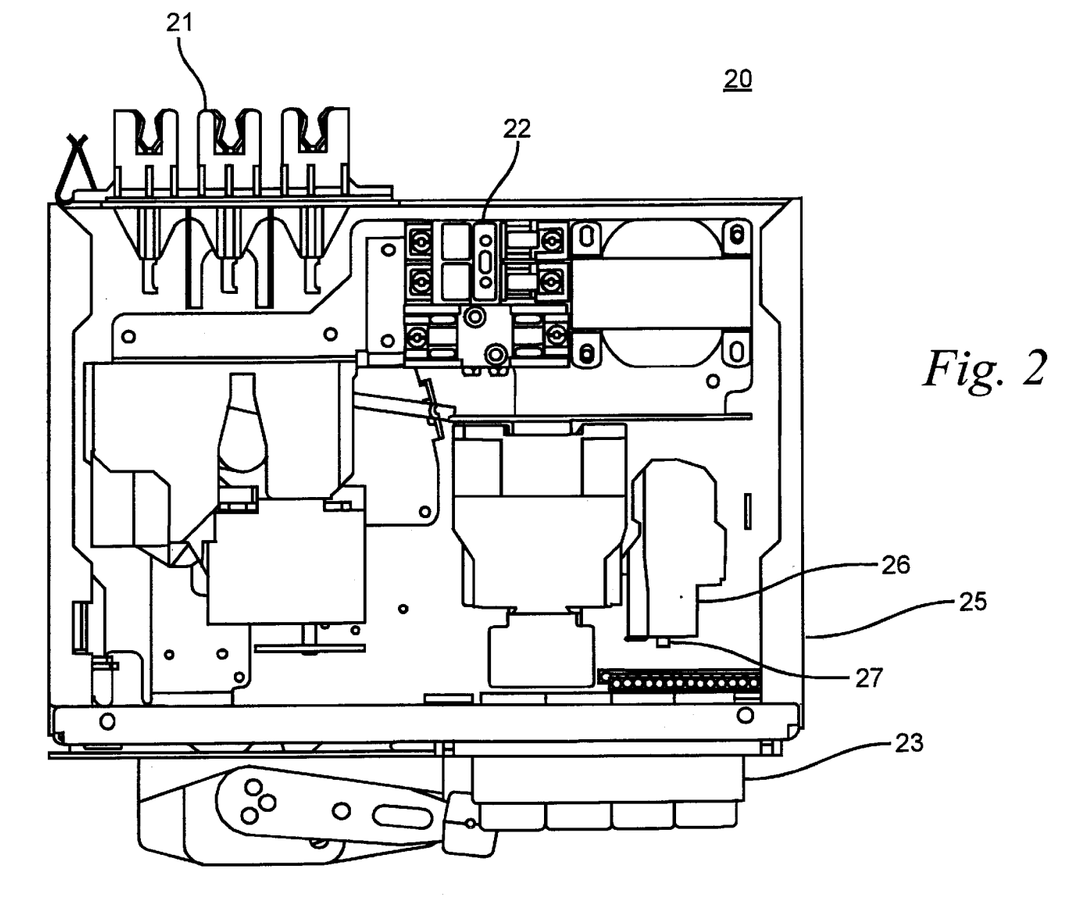
FIG. 2 is a top view of the motor starter assembly of FIG. 1.
Figure 3:
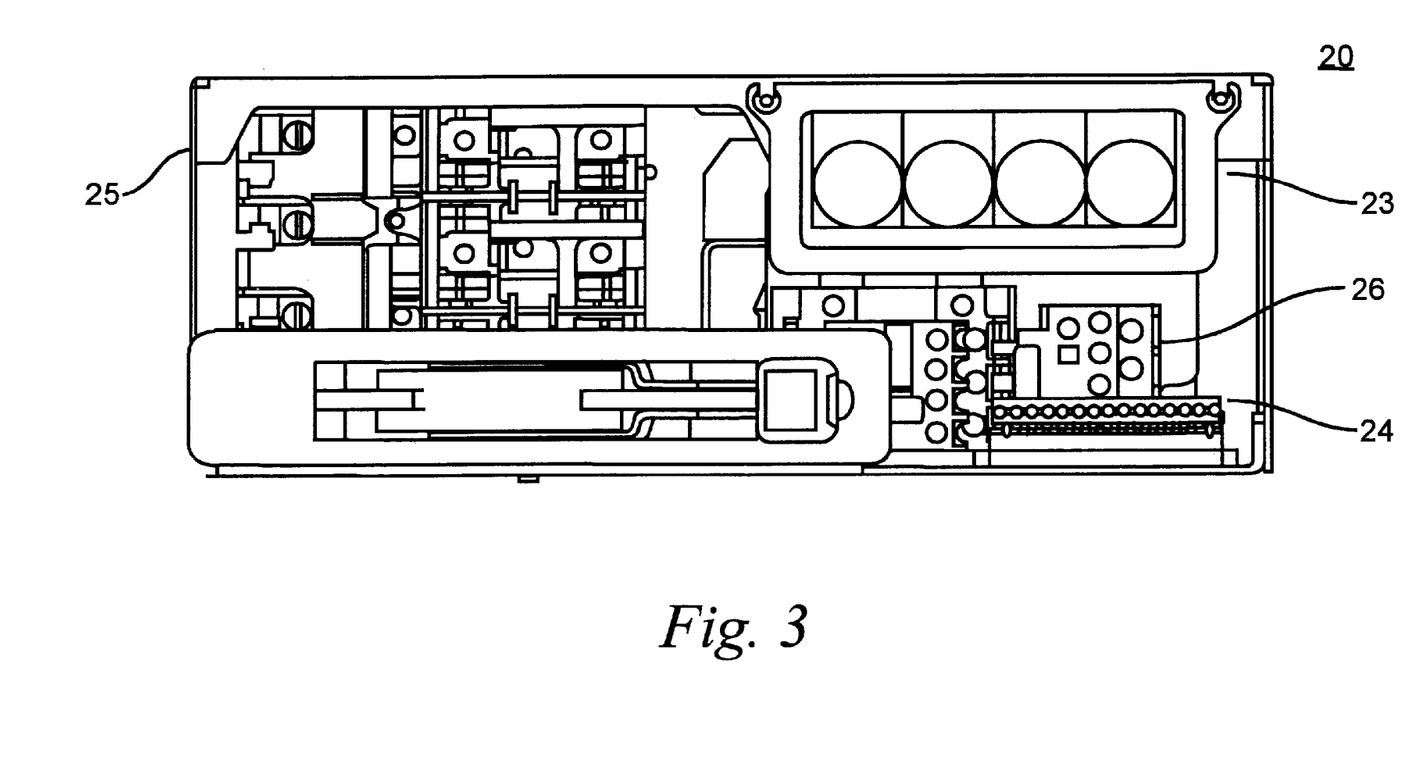
FIG. 3 is a front view of the motor starter assembly of FIG. 1.
Figure 4:
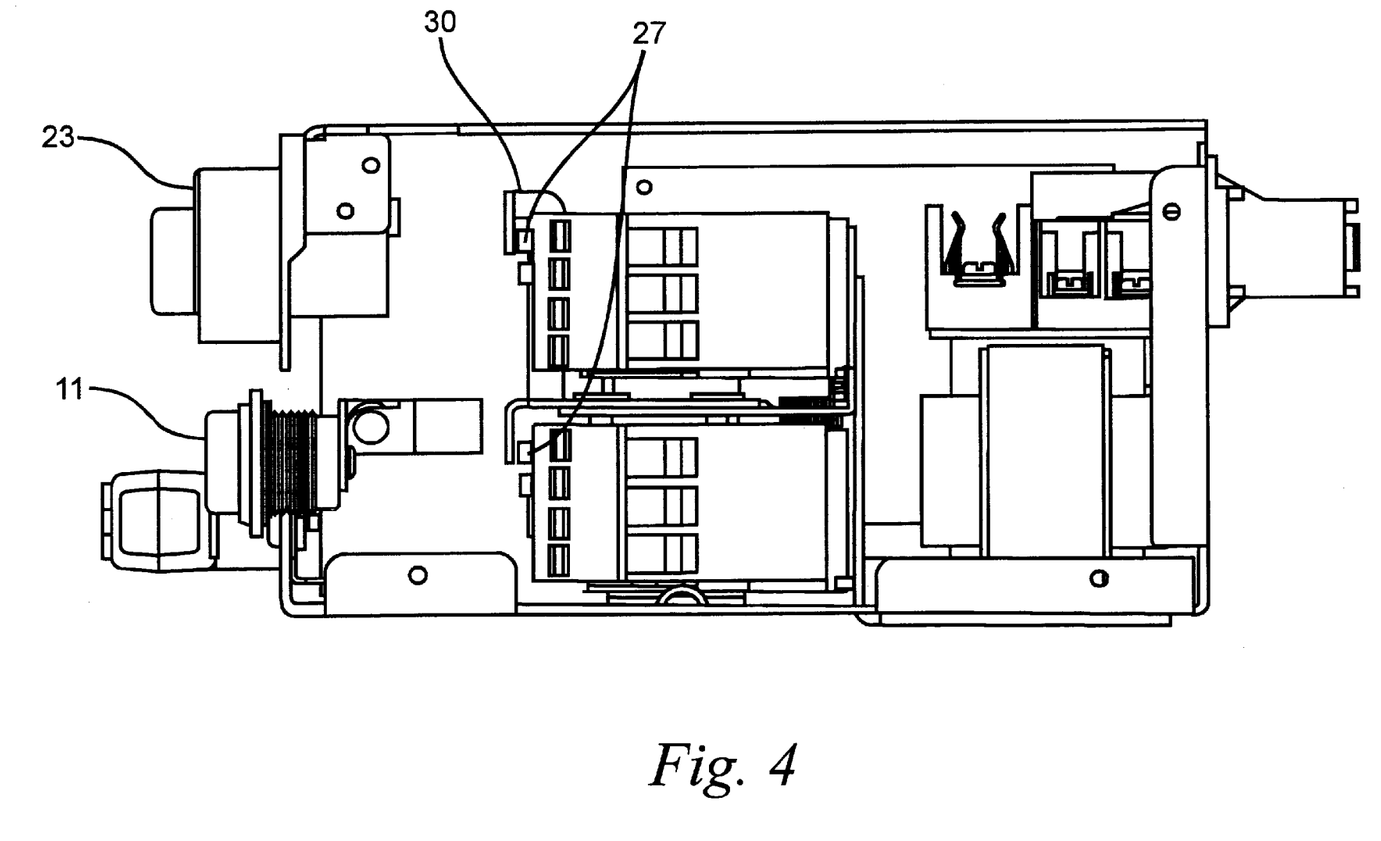
FIG. 4 is a side view of the motor starter assembly of FIG. 1.
Figure 5:
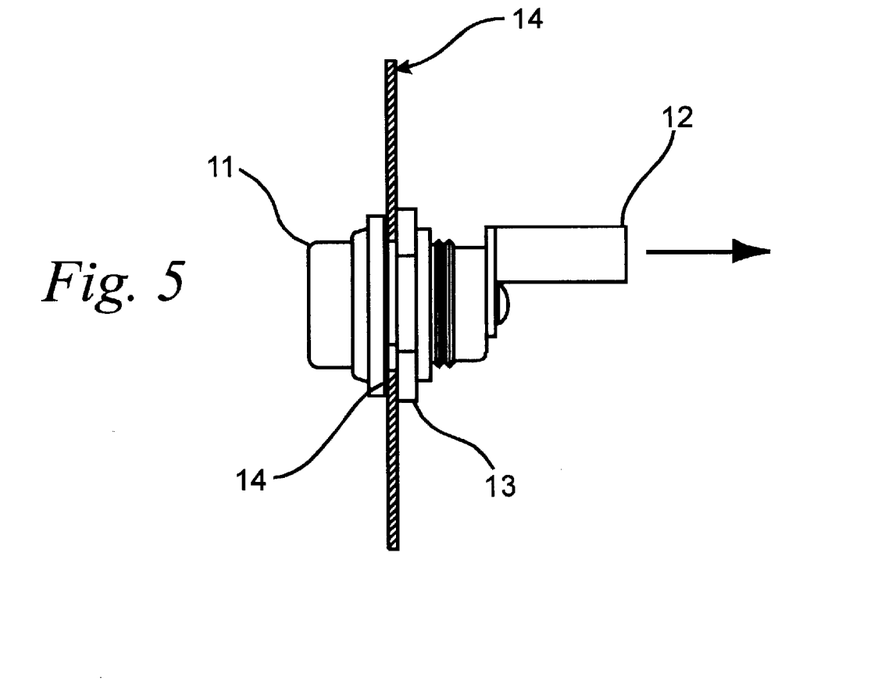
FIG. 5 is a side view of a reset button as mounted to a motor control center.
Figure 6:
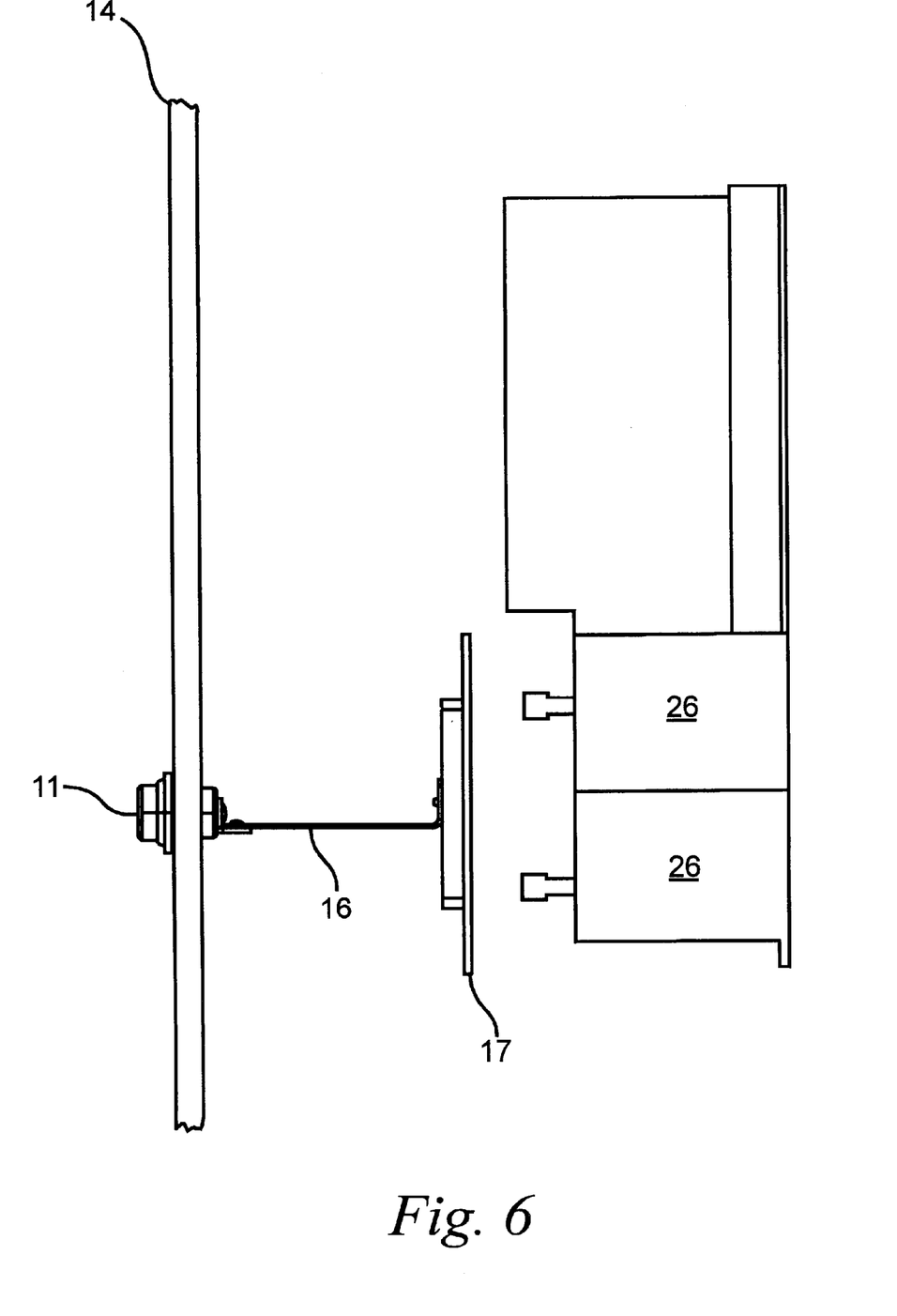
FIG. 6 is a side view of a prior art reset mechanism comprising a T-bar mounted to an extension arm and reset button projection on a motor control center.

A manual door mounted reset button 11 having a rearwardly extending projection 12, shown in FIG. 5, is connected with a securing element 13 to the motor control center door 14 and allows the overload relay reset buttons 27 to be depressed without opening the motor control center door 14. A coil spring (not shown) biases the door mounted reset button 11 in a forward direction thereby requiring an operator to manually depress the door mounted reset button 11 in a rearward direction, wherein the projection 12, extension arm 16 or T-bar 17, in combination with extension arm 16, engages the overload relay reset button 27. FIG. 6 shows T-bar 17 utilized in combination with a door mounted reset button 11 to reset a plurality of overload relays. However, based upon the configuration of the motor starter assembly 20, the control station panel assembly 23 may prevent access of the control center door mounted reset button 11 or extension arm 16 and T-bar 17 to the overload relay 26. Due to space constraints, a T-bar 17 mounted to the manual reset button's extension arm 16 cannot be used and still allow opening and closing of the motor control center door 14.

Figure 7:
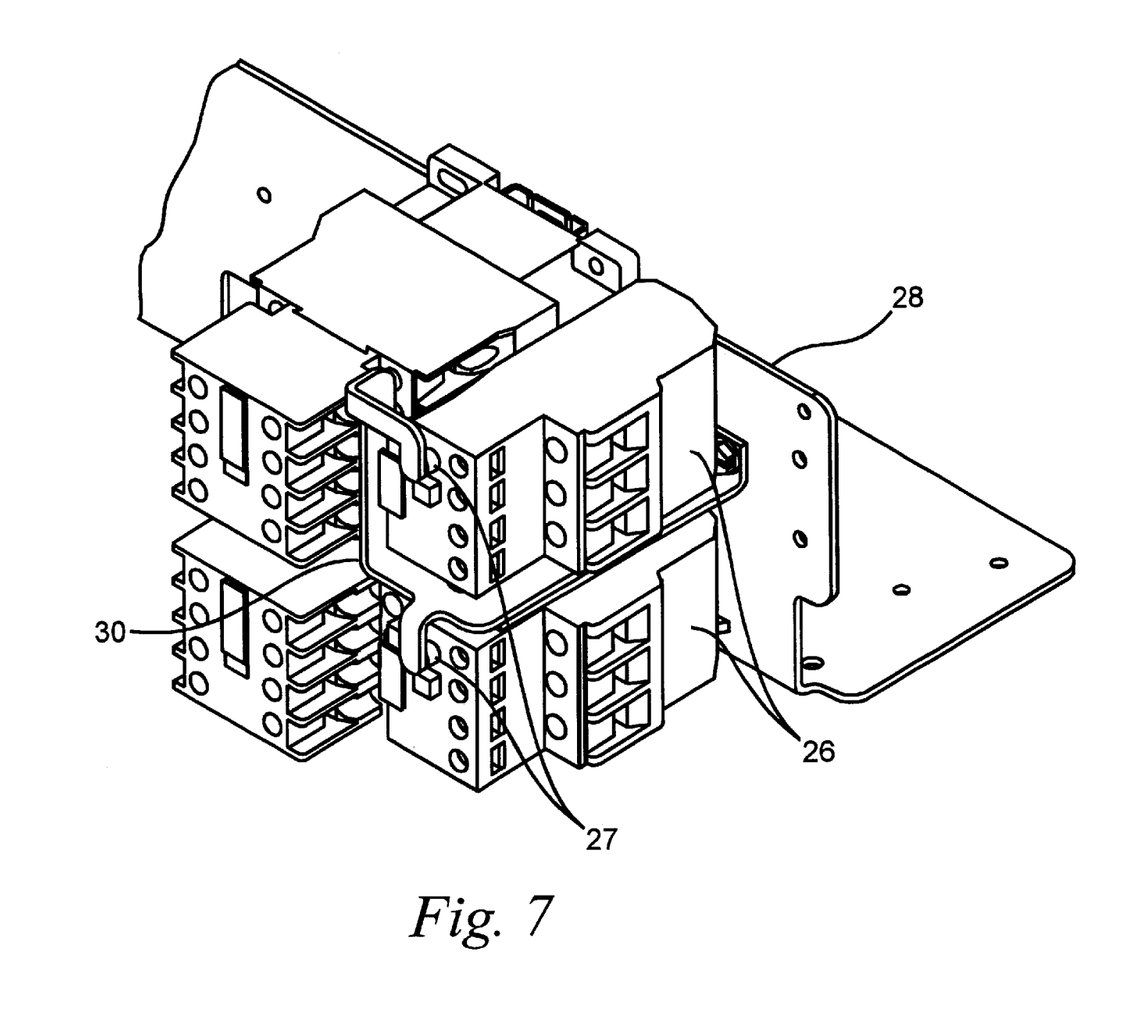
FIG. 7 is a perspective view of a relay reset mechanism in a non-contact position with a plurality of overload relays.

Referring to FIG. 7, the relay reset mechanism 30 of the present invention allows the door mounted reset button's extension arm 16 to depress the single point-to-two point overload relay reset mechanism 30, which in turn depresses both overload relay reset buttons 27 substantially simultaneously. There is no interference of the door 14 opening or closing with the use of the single point-to-two point overload relay reset mechanism 30 and access to both overload relay reset buttons 27 is achieved.

Figure 8:
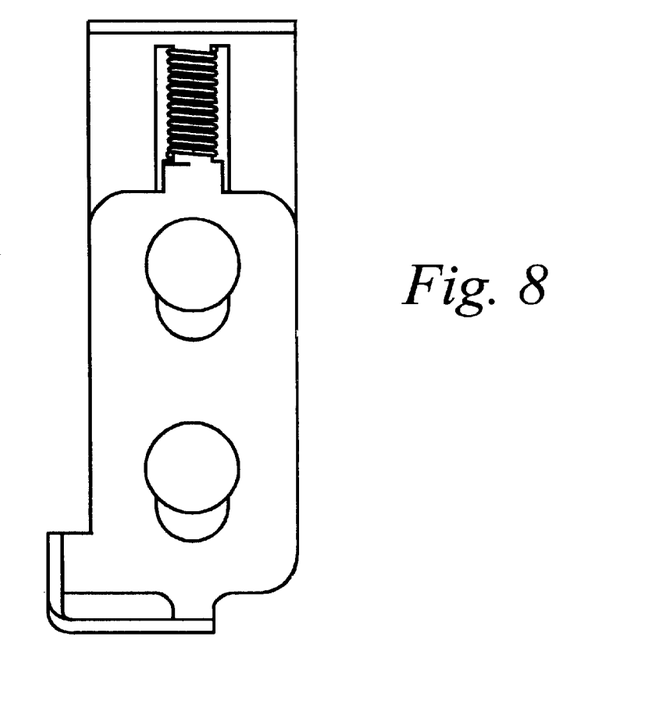
FIG. 8 is a top view of a relay reset mechanism which allows for the reset of a plurality of relays.
Figure 9:
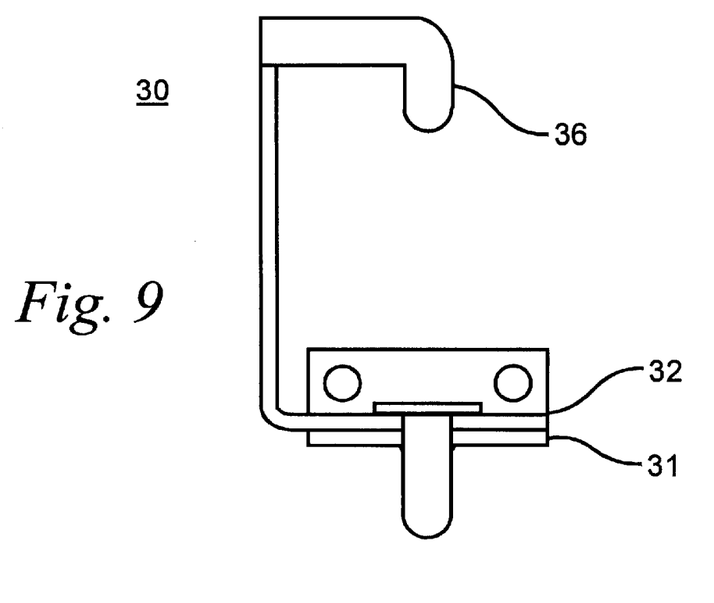
FIG. 9 is a front view of the relay reset mechanism of FIG. 8.
Figure 10:
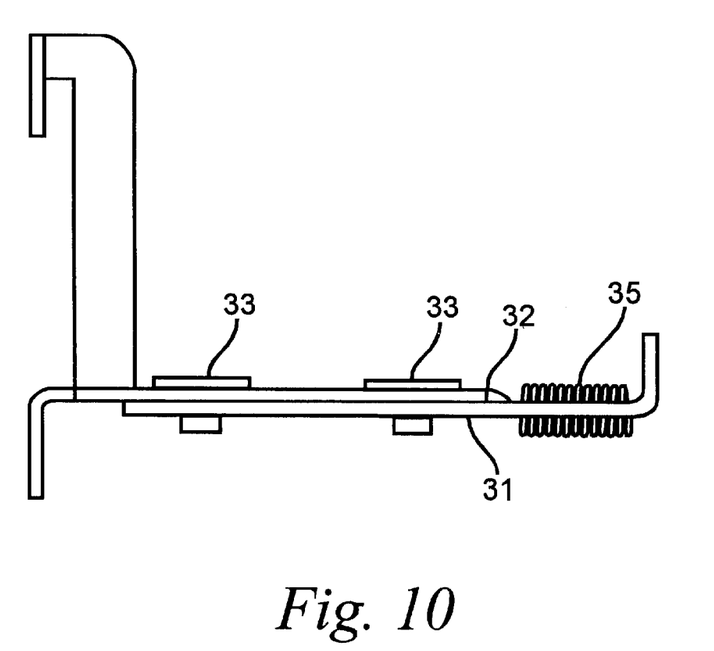
FIG. 10 is a side view of the relay reset mechanism of FIG. 8.

The relay reset mechanism 30 comprises a stationary member 31, preferably a base plate, mounted to the identical mounting surface 28 to which the motor starter assembly 20 is mounted, as shown in FIG. 7. Referring to FIGS. 8–10, the relay reset mechanism 30 has a retractable member 32 which is secured to the stationary member 31, preferably with the use of the shoulder rivets 33 passing through apertures 34 on the retractable member 32, thereby allowing for reciprocating motion of the retractable member 32 perpendicular to the mounting surface 28. A retraction device 35, preferably a return spring, is fitted between the stationary member 31 and retractable member 32 to return the retractable member 32 to its original position when the force applied by the door mounted reset button's extension arm 16 is removed.

Again referring to FIG. 7, the relay reset mechanism 30 is positioned between the plurality of overload relays 26 of the motor starter assembly 20. As a force is applied to the door mounted reset button 11 and extension arm 16, the force is transferred to the relay reset mechanism 30, which contacts and depresses both overload relay reset buttons 27 substantially simultaneously. This is accomplished with the retractable member 32 having a first contact member 37, preferably a flanged tab, positioned over one overload relay reset button 27 and a second extended contact member 36, preferably a flanged tab similar to the first contact member 37, positioned over an additional overload relay reset button 27. Once force to the door mounted reset button 11 and extension arm 16 is removed, retraction device 35 permits the retractable member 32 to return to its initial position. In the initial position, the relay reset mechanism 30 is primed for the next occurrence where the operator will need to reset the overload relays.

The foregoing description is directed to particular embodiments of the present invention for the purpose of illustration and explanation. It will be apparent, however, to one skilled in the art that many modifications and changes to the embodiment set forth above are possible without departing from the spirit of the invention.

What is claimed:

1. A motor control center for housing a starter assembly, comprising:

(a) at least two overload relays, each said overload relay having a separate reset element for resetting its respective relay from an open circuit to a closed circuit;

(b) a mechanism for substantially simultaneously resetting each of said at least two overload relays, said mechanism including:

(1) a retractable member having a contact member adjacent each said reset element, said retractable member upon application of force adapted to move between a first non-contact position to a second contact position, wherein said contact member comes in contact with each of said overload relay reset elements when moved from the first non-contact position to the second contact position to reset each of said overload relays; and (2) a retraction device for moving said retractable member from the second contact position to the first non-contact position upon release of a force from said retractable member.

2. The motor control center of claim 1, wherein said retractable member further comprises a base plate displaced in between said at least two overload relays.

3. The motor control center of claim 1, wherein said retraction device includes a spring that is compressed when said retractable member is moved from the first non-contact position to the second contact position.

4. The motor control center of claim 3, wherein said spring causes said retractable member to move from the second contact position to the first non-contact position when the force on said retractable member is removed.

5. The motor control center of claim 1, wherein said retractable member is made of a unitary piece.

6. A motor control center, comprising:

(a) at least one control unit housed within the motor control center;

(b) at least two overload relays conductively connected to said at least one control unit, each said overload relay having a separate reset element for resetting its respective relay from an open circuit to a closed circuit;

(c) a mechanism for substantially simultaneously resetting each of said at least two overload relays, said mechanism including:

(1) a retractable member having a contact member adjacent each said reset element, said retractable member upon application of force adapted to move between a first non-contact position to a second contact position, wherein said contact member comes in contact with each of said overload relay reset elements when moved from the first non-contact position to the second contact position to reset each of said overload relays; and (2) a retraction device for moving said retractable member from the second contact position to the first non-contact position upon release of the force from said retractable member.

7. The motor control center of claim 6, wherein said at least one control unit is a starter assembly.

8. The motor control center of claim 6, wherein said at least one control unit comprises a plurality of control units.

9. The motor control center of claim 8, wherein said plurality of control units comprise a starter, branch feeder devices and lighting panelboards.

10. The motor control center of claim 8, further comprising a common bus bar for distributing power to said plurality of control units.

11. The motor control center of claim 6, wherein said retractable member further comprises a base plate displaced in between said at least two overload relays.

12. The motor control center of claim 6, wherein said retraction device includes a spring that is compressed when said retractable member is moved from the first non-contact position to the second contact position.

13. The motor control center of claim 12, wherein said spring causes said retractable member to move from the second contact position to the first non-contact position when the force of said retractable member is removed.

14. The motor control center of claim 6, wherein said retractable member is made of a unitary piece.

15. A motor control center comprising:

(a) at least one control unit housed within the motor control center;

(b) at least two overload relays conductively connected to said at least one control unit, each said overload relay having a separate reset element for resetting its respective overload relay from an open circuit to a closed circuit;

(c) a mechanism for substantially simultaneously resetting each of said at least two overload relays, said mechanism comprising:

(1) a retractable member configured to avoid any obstruction positioned between a reset button mounted on a door of the motor control center and said at least two overload relays, said retractable member having a contact member associated with each said reset element, said retractable member upon application of force adapted to move between a first non-contact position to a second contact position, wherein said contact member comes in contact with its associated reset element to substantially simultaneously reset each of said at least two overload relays; and (2) a retraction device for moving said retractable member from the second contact position to the first non-contact position upon release of the force from said retractable member.

* * * * *